3,213,119
BIS[DIHYDROCARBYL(PENTACHLOROPHENOXY)
TIN] OXIDES
Glenn R. Wilson, Cambridge, Mass., assignor to Monsanto Research Corporation, St. Louis, Mo., a corporation of Delaware
No Drawing. Filed May 14, 1962, Ser. No. 194,643
3 Claims. (Cl. 260—429.7)

The present invention relates to organic compounds of tin and more particularly provides certain new and valuable oxygen-containing haloaromatic compounds of tin and methods of preparing the same.

According to the invention there are provided the hitherto unknown bis[dihydrocarbon(haloaryloxy)tin] oxides by reaction of a diorganotin oxide with a halophenol, substantially according to the scheme:

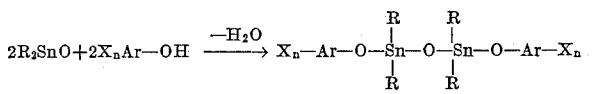

wherein R denotes a hydrocarbon group which is free of olefinic and acetylenic unsaturation and contains from 1 to 12 carbons, X is halogen, $n$ is an integer of 1 to 5, Ar is an aromatic hydrocarbon radical which is attached through nuclear carbon to the remainder of the molecule of which it forms a part, is free of olefinic and acetylenic unsaturation, and contains from 6 to 12 carbon atoms.

Formation of the bis[dihydrocarbon(haloaryloxy)tin] oxides from the diorganotin oxide and the halophenols is surprising, since reaction of diorganotin oxides with thiophenols is known to give dihydrocarbonbis(hydrocarbonoxy)tins (see U.S. 2,801,258 to Johnson and British Patent No. 719,421 to Ramsdell et al.).

The two hydrocarbon radicals which are attached to tin in the diorganotin oxide may be the same or dissimilar and the same hydrocarbon groups do not need to be present at both moles of the oxide reactant. The hydrocarbon radicals of the diorganotin oxide may be alkyl, aryl, alkaryl, aralkyl, cycloalkyl or cycloalkyl-alkyl or cycloalkyl-aryl. The halophenol may be a halophenol or a halonaphthol or a halogenated phenylphenol, and it may or may not have alkyl substituents attached to the aromatic nucleus thereof, provided that, of course, the total content of carbon stays within the 6 to 12 carbon atom limitation and that there is present at least one halogen atom at the aromatic nucleus.

Examples of bis[dihydrocarbon(haloaryloxy)tin] oxides of the invention and the reactants from which they are prepared are as follows:

Bis[dimethyl-(4-chlorophenoxy)tin] oxide from dimethyltin oxide and 4-chlorophenol
Bis[dipentyl-(2,4-dichlorophenoxy)tin] oxide from dipentyltin oxide and 2,4-dichlorophenol
Bis[dibenzyl-(3-bromophenoxy)tin] oxide from dibenzyltin oxide and 3-bromophenol
Bis[dicyclohexyl-(pentachlorophenoxy)tin] oxide from dicyclohexyltin oxide and pentachlorophenol
Bis[di-o-, m- or p-tolyl-($\beta$-chloro-$\alpha$-naphthyloxy)tin] oxide from di-o-, m- or p-tolyltin oxide and $\beta$-chloro-$\alpha$-naphthol
Bis[dodecylethyl(4-fluorophenoxy)tin] oxide from dodecylethyltin oxide and 4-fluorophenol
Bis[diphenyl-(2-chloro-4-iodophenoxy)tin] oxide from diphenyltin oxide and 2-chloro-4-iodophenol
Bis[di-$\beta$-naphthyl-(pentachlorophenoxy)tin] oxide from di-$\beta$-naphthyltin oxide and pentachlorophenol
Bis[diethyl-(4-chloro-p-biphenylyloxy)tin] oxide from diethyltin oxide and 4-(4-chlorophenyl)phenol
Bis[di-n-octyl-(2-butyl-3-chlorophenoxy)tin] oxide from di-n-octyltin oxide and 2-butyl-3-chlorophenol
Bis[diphenyl(pentafluorophenoxy)tin] oxide from diphenyltin oxide and pentafluorophenol
Bis[dicyclopentyl(2,3,5,6-tetrachlorophenoxy)tin] oxide from dicyclopentyltin oxide and 2,3,5,6-tetrachlorophenol
Bis[bis(2-phenylethyl)(pentabromophenoxy)tin] oxide from bis(2-phenylethyl)tin oxide and pentabromophenol
Bis[bis(4 - butylphenyl)(2 - butyl - 4 - chlorophenoxy)tin] oxide from bis(4-butylphenyl)tin oxide and 2-butyl-4-chlorophenol Reaction of the halophenol with the dihydrocarbyltin oxide takes place readily by mixing together the two reactants at ordinary, decreased or increased temperature and in the presence or absence of a catalyst and/or an inert, organic liquid diluent and allowing the mixture to stand until formation of the bis[dihydrocarbon(haloaryloxy)tin] oxide has taken place. Advantageously, reaction is effected by heating the two reactants at a temperature of from say, 50° C. to refluxing in the presence of an inert organic liquid diluent, preferably a liquid which forms an azeotrope with water, e.g. benzene, toluene, xylene, or tert-butylbenzene. Also useful as diluents are hexane and kerosene; halogenated hydrocarbons such as carbon tetrachloride or hexachloroethane; ethers such as ethyl ether, dioxane or the methyl ether of diethylene glycol; amides such as dimethylformamide; sulfoxides such as dimethyl sulfoxide; nitro compounds such as 2-nitropropane or nitrobenzene, etc. As catalysts there may be used organic or inorganic acidic materials such as p-toluenesulfonic acid, sulfuric acid or hydrochloric acid.

The progress of the reaction can be gauged by noting change in viscosity of the reaction mixture and/or evolution of by-product water. When reaction has been completed as evident from, e.g., cessation in evolution of water, the diluent, if one had been employed, is evaporated to give a residue comprising the bis[dihydrocarbon(haloaryloxy)tin] oxide. Depending upon the intended utility of the product, further purification, e.g., by solvent extraction, recrystallization, etc., may or may not be conducted. Advantageously, the reactants are employed in substantially equimolar proportions; however, an excess of either may be employed, since unreacted material can be readily recovered from the product.

The bis[dihydrocarbon(haloaryloxy)tin] oxides are stable, well defined compounds which are generally waxy or crystalline solids. They are advantageously employed for a variety of industrial and agricultural purposes, e.g., as heat and light stabilizers for polymeric products such as polyvinyl chloride, and as insecticides and fungicides. As disclosed in the copending application of Glenn R. Wilson, John R. Stemniski and Kenneth L. McHugh, Serial No. 194,650, filed of even date, they are particularly valuable as anti-wear and extreme pressure-resisting additives for polyphenyl ether lubricant compositions.

The invention is further illustrated by, but not limited to, the following examples:

*Example 1*

A mixture of 0.1 mole of diphenyltin oxide and 0.2 mole of pentachlorophenol was refluxed in toluene as diluent under a Dean-Stark trap until substantially 0.1 mole of water had collected. Removal of the toluene by distillation under partial vacuum and crystallization of the residue from dioxane-water gave white crystals of bis[diphenyl(pentachlorophenoxy)tin] oxide, M.P. 157–170° C. and having the structure

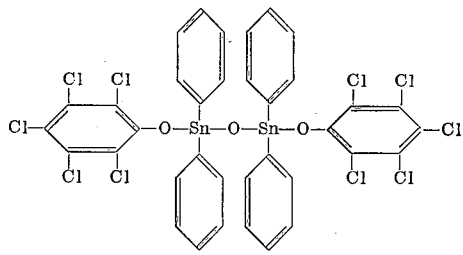

Example 2

A mixture consisting of 0.06 mole of dibutyltin oxide and 0.12 mole of pentachlorophenol was refluxed under a Dean-Stark trap until 0.06 mole of water had collected. The toluene was then removed by distillation under reduced pressure and the residue was crystallized from petroleum ether to give tan crystals of the substantially pure bis[dibutyl(pentachlorophenoxy)tin] oxide, M.P. 145–147° C.

Example 3

The bis[diphenyl(pentachlorophenoxy)tin] oxide of Example 1 was tested as an anti-wear additive for a polyphenyl ether lubricant consisting by weight of 65% of m-bis(m-phenoxyphenoxy)benzene
30% of m-[(m-phenoxyphenoxy)(p-phenoxyphenoxy)]benzene
5% of m-bis(p-phenoxyphenoxy)benzene Testing was conducted using the Shell Four-Ball Wear Tester (see R. G. Larsen, "The Study of Lubrication Using the Four-Ball Type Machine," Lubrication Engineering, vol. 1, pp. 35–43, 59, August 1945). This tester consists of four stainless steel balls arranged in the form of an equilateral tetrahedron, with the three lower balls immovably clamped in a ball holder. The fourth or upper ball is rotated about a vertical axis in contact with the three lower stationary balls at 1235 r.p.m. for one hour under a prescribed load and temperature. The contacting surfaces are immersed in the test fluid and the circular scars worn in the surface of the three stationary balls are measured by means of a low power microscope in order to provide a measure of wear which is directly related to the load, speed and time of test.

Employing the above procedure, there was obtained for a test sample of the polyphenyl ether lubricant containing 1.0% by weight of the compound of Example 1, a scar diameter of 1.26 mm. at 40 kg. and 600° F., as compared to 2.92 mm., the value obtained for the polyphenyl ether lubricant, alone, under the same testing conditions.

What I claim is:
1. A compound of the formula

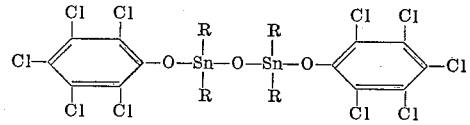

wherein R is a hydrocarbon radical which is free of olefinic and acetylenic unsaturation and contains from 1 to 12 carbon atoms.
2. Bis[diphenyl(pentachlorophenoxy)tin] oxide.
3. Bis[dibutyl(pentachlorophenoxy)tin] oxide.

References Cited by the Examiner
UNITED STATES PATENTS

| | | | |
|---|---|---|---|
| 2,626,954 | 1/53 | Albert | 260—429.7 |
| 2,867,641 | 1/59 | Ramsden | 260—429.7 |
| 3,099,668 | 7/63 | Zweigle | 260—429.7 |
| 3,113,144 | 12/63 | Zweigle | 260—429.7 |

OTHER REFERENCES

Harada: "Sci. Papers Inst. Phy. and Chem. Research" (Tokyo), 35 (1939), page 304.

TOBIAS E. LEVOW, *Primary Examiner.*
ABRAHAM H. WINKELSTEIN, *Examiner.*